(12) United States Patent
Belton

(10) Patent No.: US 8,212,438 B2
(45) Date of Patent: Jul. 3, 2012

(54) COOLANT SYSTEM FOR ELECTRIC MOTORCYCLE

(75) Inventor: Brian Belton, Rancho Dominguez, CA (US)

(73) Assignee: U.S. Alternate Energy, LLC, Cougers, NY (US)

( * ) Notice: Subject to any disclaimer, the term of this patent is extended or adjusted under 35 U.S.C. 154(b) by 309 days.

(21) Appl. No.: 12/690,044

(22) Filed: Jan. 19, 2010

(65) Prior Publication Data

US 2011/0175467 A1 Jul. 21, 2011

(51) Int. Cl.
*H02K 9/00* (2006.01)

(52) U.S. Cl. .......................................... 310/54; 310/52

(58) Field of Classification Search ............... 310/54, 310/52, 58, 64
See application file for complete search history.

(56) References Cited

U.S. PATENT DOCUMENTS

| | | | |
|---|---|---|---|
| 5,255,733 A | 10/1993 | King | |
| 5,965,996 A | 10/1999 | Arledge | |
| 6,047,786 A | 4/2000 | Stevenson | |
| 6,199,651 B1 | 3/2001 | Gay | |
| 6,199,652 B1 | 3/2001 | Mastroianni | |
| 6,326,765 B1 | 12/2001 | Hughes | |
| 6,724,165 B2 | 4/2004 | Hughes | |
| 7,255,191 B2 | 8/2007 | Baldwin | |
| 7,975,799 B2 * | 7/2011 | James et al. | 180/291 |
| 2005/0140114 A1 | 6/2005 | Lederer | |
| 2005/0146207 A1 | 7/2005 | Wagner | |
| 2008/0131764 A1 | 6/2008 | Saiki | |
| 2008/0185205 A1 * | 8/2008 | Kaminokado | 180/220 |

* cited by examiner

*Primary Examiner* — Nguyen N Hanh
(74) *Attorney, Agent, or Firm* — Mark Terry

(57) ABSTRACT

A cooling system for an electric motor of an electric motorcycle is disclosed. The cooling system includes a motorcycle frame including an internal volume, an entrance orifice and an exit orifice. The cooling system further includes an electric motor including an internal volume, a first tubular element connecting the exit orifice with the electric motor and a second tubular element connecting the electric motor with the entrance orifice. The cooling system further includes a liquid coolant located within the internal volume of the frame, the internal volume of the first and second tubular elements and the internal volume of the electric motor. The cooling system further includes a pump for circulating the liquid coolant from the electric motor, through the second tubular element, through the entrance orifice of the frame, through the internal volume of the frame, through the exit orifice of the frame and back to the electric motor.

16 Claims, 5 Drawing Sheets

COOLANT SYSTEM FOR ELECTRIC MOTORCYCLE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention relates to the filed of coolant systems, and more particularly to cooling systems for electric motors.

BACKGROUND OF THE INVENTION

Coolant or cooling systems for motorcycles have been around for many years. One popular method of cooling an internal combustion engine for a motorcycle is liquid cooling. This approach to engine cooling involves the use of a radiator (similar to the radiator on a car) for dissipating heat produced by the engine. A motorcycle radiator uses coolant (i.e., water or a coolant liquid) that circulates constantly between the radiator and the cylinders of the engine during operation, thereby dispersing the engine heat. Another approach to engine cooling takes advantage of the air blowing past the cylinder and cylinder head while in motion to disperse heat. The cylinders on these air cooled motorcycles may include fins (i.e., heat sinks) to aid in the heat dissipation process. Air cooled motorcycles may also be equipped with fans that force air past the cylinder block in the event of sustained stationary periods that may cause over-heating.

One of the main drawbacks of conventional radiator-cooled systems described above is the limited amount of coolant available to cool the motor. Generally, the amount of coolant available to cool the motor is limited to the internal volume or capacity of the cooling system. I.e., the cooling system can only retain as much coolant as the radiator can hold. Another drawback of conventional radiator-cooled systems is the limited amount of surface area of the radiator available to disperse the heat that is garnered by the liquid coolant. Because motorcycles and mopeds have a relatively small overall size, there is a reduced amount of space available for a radiator. This, in turn, limits the amount of surface area available for the radiator to radiate the heat picked up by the liquid coolant. As a result, the cooling capacity of a motorcycle radiator is restricted.

Yet another drawback of conventional radiator-cooled systems is the limited number of systems directed to cooling electric motors. An electric motor generates heat in a different manner, in different locations and in different amounts compared to an internal combustion motor. Consequently, cooling of the electric motor in an electric motorcycle involves needs that are not currently met by conventional radiator-cooled systems for motorcycles. U.S. Pat. Nos. 5,293,089 and 5,859,482 disclose liquid-cooled electric motors but fail to disclose an adequate mechanism for dissipating the heat siphoned from the electric motor. U.S. Pat. Nos. 5,255,733 and 5,531,285 disclose liquid-cooled motors for hybrid vehicles but only in conjunction with a conventional radiator for dissipating heat.

Therefore, a need exists to overcome the problems with the prior art as discussed above, and particularly for a more efficient cooling system for an electric motor of a motorcycle.

SUMMARY OF THE INVENTION

Briefly, according to an embodiment of the present invention, a cooling system for an electric motor of an electric motorcycle is disclosed. The cooling system includes a motorcycle frame including an internal volume, an entrance orifice and an exit orifice. The cooling system further includes an electric motor including an internal volume, a first tubular element connecting the exit orifice with the electric motor and a second tubular element connecting the electric motor with the entrance orifice. The cooling system further includes a liquid coolant located within the internal volume of the frame, the internal volume of the first and second tubular elements and the internal volume of the electric motor. The cooling system further includes a pump for circulating the liquid coolant from the electric motor, through the second tubular element, through the entrance orifice of the frame, through the internal volume of the frame, through the exit orifice of the frame and back to the electric motor.

In another embodiment of the present invention, a cooling system for an electric motor of an electric motorcycle is disclosed. The cooling system includes a motorcycle frame comprising a dual bar configuration comprising a left-side bar and a right-side bar, wherein both bars are coupled at one end to a stem of the frame and wherein both bars include an internal volume. The cooling system further includes an entrance orifice located in the right-side bar, a tubular bridge that connects the left-side bar and the right-side bar such that the internal volume of the left-side bar is contiguous with the internal volume of the right-side bar and an exit orifice located in the left-side bar. The cooling system further includes an electric motor including an internal volume, a first tubular element connecting the exit orifice with the electric motor and a second tubular element connecting the electric motor with the entrance orifice. The cooling system further includes a liquid coolant located within the internal volume of the right-side bar, the internal volume of the left-side bar, the internal volume of the first and second tubular elements and the internal volume of the electric motor. The cooling system further includes a pump for circulating the liquid coolant from the electric motor, through the second tubular element, through the entrance orifice of the frame, through the internal volume of the right-side and left-side bars, through the exit orifice of the frame and back to the electric motor.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

The present invention provides a liquid cooling system for the electric motor of an electric motorcycle. The cooling system comprises a pump that drives a coolant through an electric motor, thereby siphoning heat away from the electric motor so as to attempt to maintain the electric motor at or near its peak operating temperature. The frame of the motorcycle contains a reservoir for holding or passing through the coolant for the cooling system. The purpose of the reservoir is to allow for greater volume of coolant to be used, as well as providing a greater volume through which the coolant passes and providing a greater surface area that comes into contact with the ambient air, thereby increasing the heat dissipation and cooling capacity of the system.

The reservoir in the motorcycle frame increases the volume available for storing coolant. This feature of the present invention is advantageous as it allows for a greater amount of coolant to be used, thereby increasing the cooling capacity of the liquid cooling system. The present invention is further beneficial as it allows for a greater volume through which the coolant passes through, which allows for increased heat dissipation capabilities. Also, the motorcycle frame, which holds the coolant, provides an additional surface area that comes into contact with the ambient air, thereby increasing the ability of the system to exude heat. This feature of the present invention is beneficial as it allows for faster and higher-capacity cooling of the coolant and, by extension, the electric motor. Lastly, the present invention allows for the dual use of the motorcycle frame as the main structural component of the vehicle, as well as a component of the cooling system, thereby reducing the number of different parts of the motorcycle and optimizing the overall simplicity and weight of the electric motorcycle.

Figure 1:
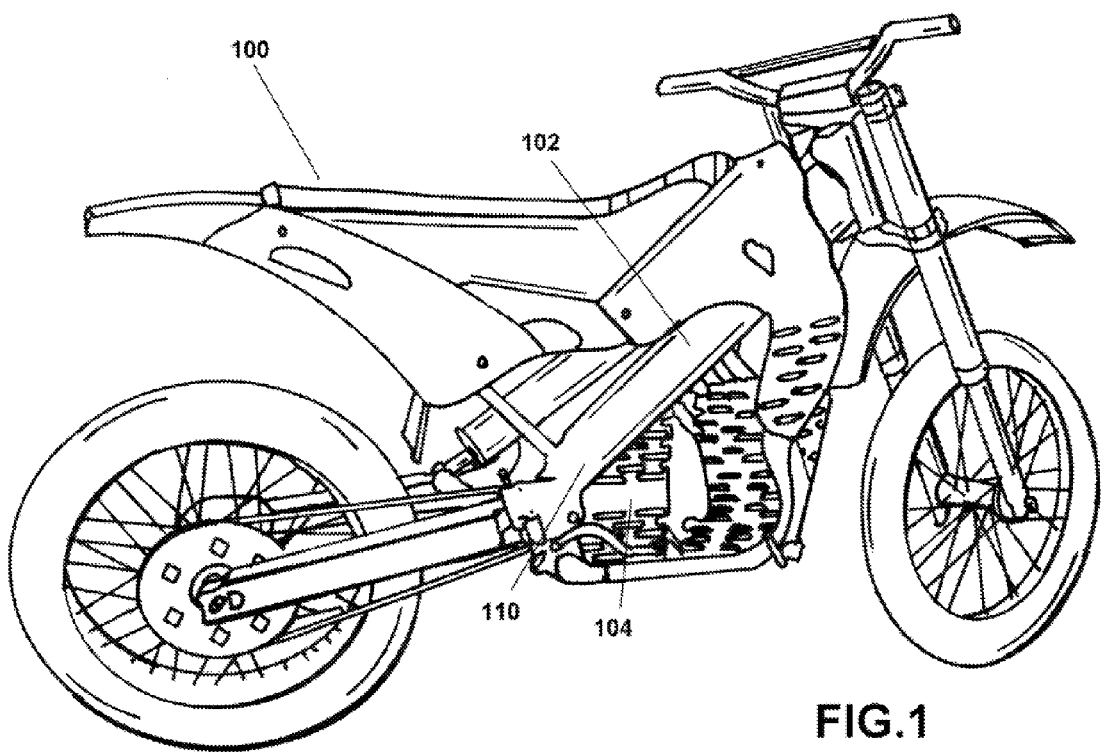
FIG. 1 is an illustration of a side view of an electric motorcycle including a liquid cooled system, according to one embodiment of the present invention.

FIG. 1 is an illustration of a side view of an electric motorcycle 100 including a liquid cooled system 110, according to one embodiment of the present invention. The liquid cooled system 110 comprises the motorcycle frame 102, which provides the main structural components of the electric motorcycle 100, and the electric motor 104, which comprises the main locomotive force of the electric motorcycle 100.

Figure 2:
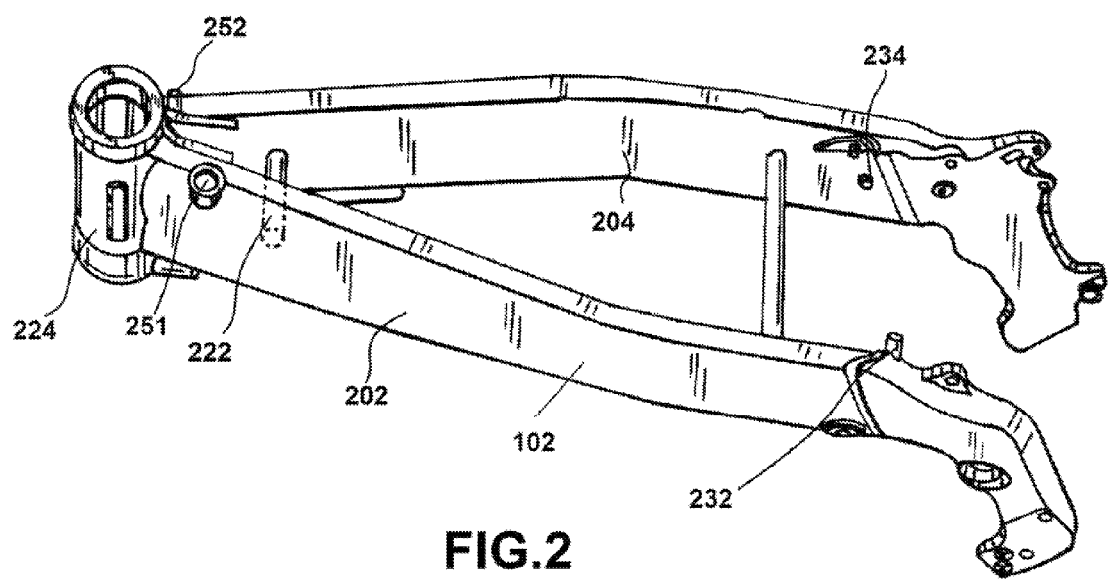
FIG. 2 is an illustration of a perspective view of a motorcycle frame for an electric motorcycle, according to one embodiment of the present invention.

FIG. 2 is an illustration of a perspective view of the motorcycle frame 102 for the electric motorcycle 100 of FIG. 1, according to one embodiment of the present invention. FIG. 2 shows that the motorcycle frame 102 may comprise a dual-bar configuration wherein a left-side bar 202 is mirrored by a right-side bar 204. The left-side bar 202 and the right-side bar 204 are each coupled on one end with the stem 224 of the electric motorcycle 100 so as to be structurally integrated with the stem 224. The method of coupling of the bars 202, 204 with the stem 224 may be welding or the bars 202, 204 may be structurally formed with the stem 224, such as by machining a single metallic unit, metal casting the frame 102 as a single unit or by weaving carbon fibers into a single unit comprising the frame 102.

The left-side bar 202 may be connected to the right-side bar 204 via tubular element 222. The left-side bar 202 and the right-side bar 204 are at least partially hollow and thereby both include an internal spatial volume for holding a liquid coolant. The internal spatial volume of the bars 202, 204 are contiguous with the internal spatial volume of tubular element 222. The liquid coolant may comprise any one of water, ethylene glycol, diethylene glycol, propylene glycol or the like.

FIG. 2 further shows that the left-side bar 202 includes an exit orifice 232 disposed in the exterior surface of the inward-facing surface area of the left-side bar 202 near the rear of the left-side bar 202. The exit orifice 232 provides access to the internal spatial volume of left-side bar 202. FIG. 2 also shows that the right-side bar 204 includes an entrance orifice 234 disposed in the exterior surface of the inward-facing surface area of the right-side bar 204 near the rear of the right-side bar 204. The entrance orifice 234 provides access to the internal spatial volume of right-side bar 204.

FIG. 2 further includes an orifice 252 disposed in the exterior surface of the outward-facing surface area of the right-side bar 204 near the front of the right-side bar 204 in close proximity to the stem 224. The orifice 252 provides access to the internal spatial volume of right-side bar 204. Orifice 252 may be fitted with a pressure relief mechanism so as to function as a vent or breather mechanism in the event of exorbitant pressure build-up within the internal volume of the right-side bar 204 and left-side bar 202. FIG. 2 also shows orifice 251 disposed in the exterior surface of the outward-facing surface area of the left-side bar 202 near the front of the left-side bar 202 in close proximity to the stem 224. The orifice 251 provides access to the internal spatial volume of left-side bar 202. Orifice 251 may further be fitted with a pressure cap so as to function as an orifice for allowing a user to pour liquid coolant into the internal volume of left-side bar 202.

Note that any or all of orifices 232, 234, 251 and 252 may comprise a collar or a raised edge that surround the orifice for facilitating the attachment of a coupling device to the orifice. Any or all of orifices 232, 234, 251 and 252 may also contain threading along the interior surface or exterior surface of the orifice, the collar or the raised edge for facilitating the attachment of a coupling device to the orifice.

The reservoir in the motorcycle frame 102 increases the volume available for storing the liquid coolant beyond the internal volume of the electric motor 104. The internal volume of frame 102 is greater than the internal volume of conventional motorcycle radiators. This feature allows for a greater amount of liquid coolant to be used to cool the electric motor 104, thereby increasing the cooling capacity of the liquid cooling system of the present invention. The greater volume within frame 102 through which the liquid coolant passes through allows for increased heat dissipation. Also, frame 102 provides a greater surface area that comes into contact with the ambient air, thereby increasing the ability of the cooling system to exude heat. The external surface area of frame 102 is greater than the external surface area of conventional motorcycle radiators. This allows for faster and higher-capacity cooling of the liquid coolant and thereby, cooling of the electric motor 104. Further, the dual use of the frame 102 as the main structural component of the motorcycle 100, as well as a component of the liquid cooling system, reduces the number of different parts of the motorcycle 100 and optimizes the overall simplicity and weight of the electric motorcycle 100.

Also note that both bars 202, 204 of frame 102 comprise substantially flat-shaped elements that result in each bar having an inward-facing exterior surface (that faces towards the interior axis of the frame 102) and an outward-facing exterior surface (that faces towards the exterior of the frame 102). This shape or design of the both bars 202, 204 of frame 102 provides a greater surface area that comes into contact with the ambient air, thereby increasing the cooling capability of the system.

Figure 3:
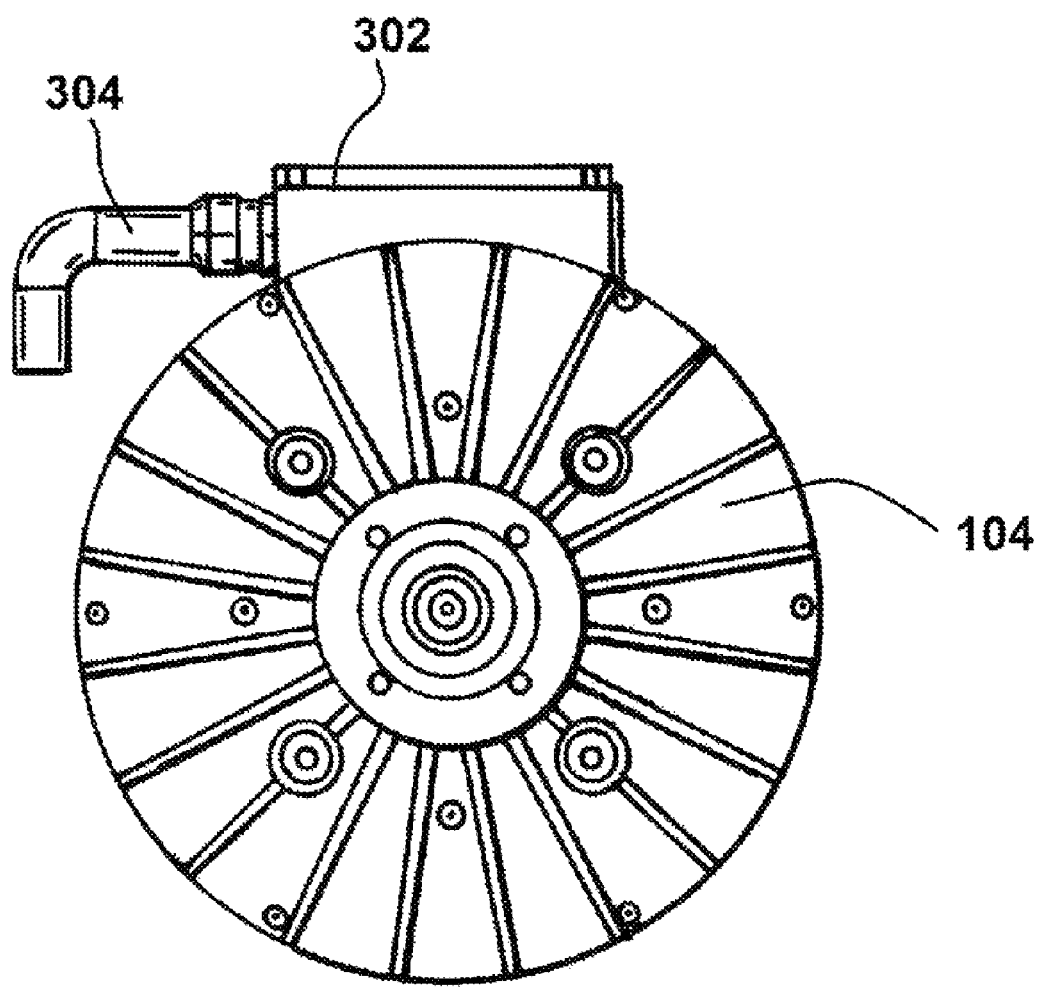
FIG. 3 is an illustration of a side view of an electric motor including a liquid cooling pump, according to one embodiment of the present invention.

FIG. 3 is an illustration of a right side view of the electric motor 104 of FIG. 1, wherein the electric motor 104 includes a liquid cooling pump 302, according to one embodiment of the present invention. The interior (not shown) of the electric motor 104 includes components well known to one of ordinary skill in the art, including a stator, a commutator that revolves within the motor housing and a rotor that provides the means by which the movement of the electric motor 104 is conveyed or translated outside the motor. The electric motor 104 includes an internal volume (now shown) for holding a liquid coolant. FIG. 3 also shows the electric motor 104 including a tubular element 304 that includes an internal volume that is contiguous with the internal volume of electric motor 104. Tubular element 304 is coupled with entrance orifice 234 of frame 102. Tubular element 304 acts as a pathway for liquid coolant that pumped by liquid cooling pump 302 out of the internal volume of electric motor 104, through entrance orifice 234 and into the internal volume of right-side bar 204 of frame 102.

Figure 4:
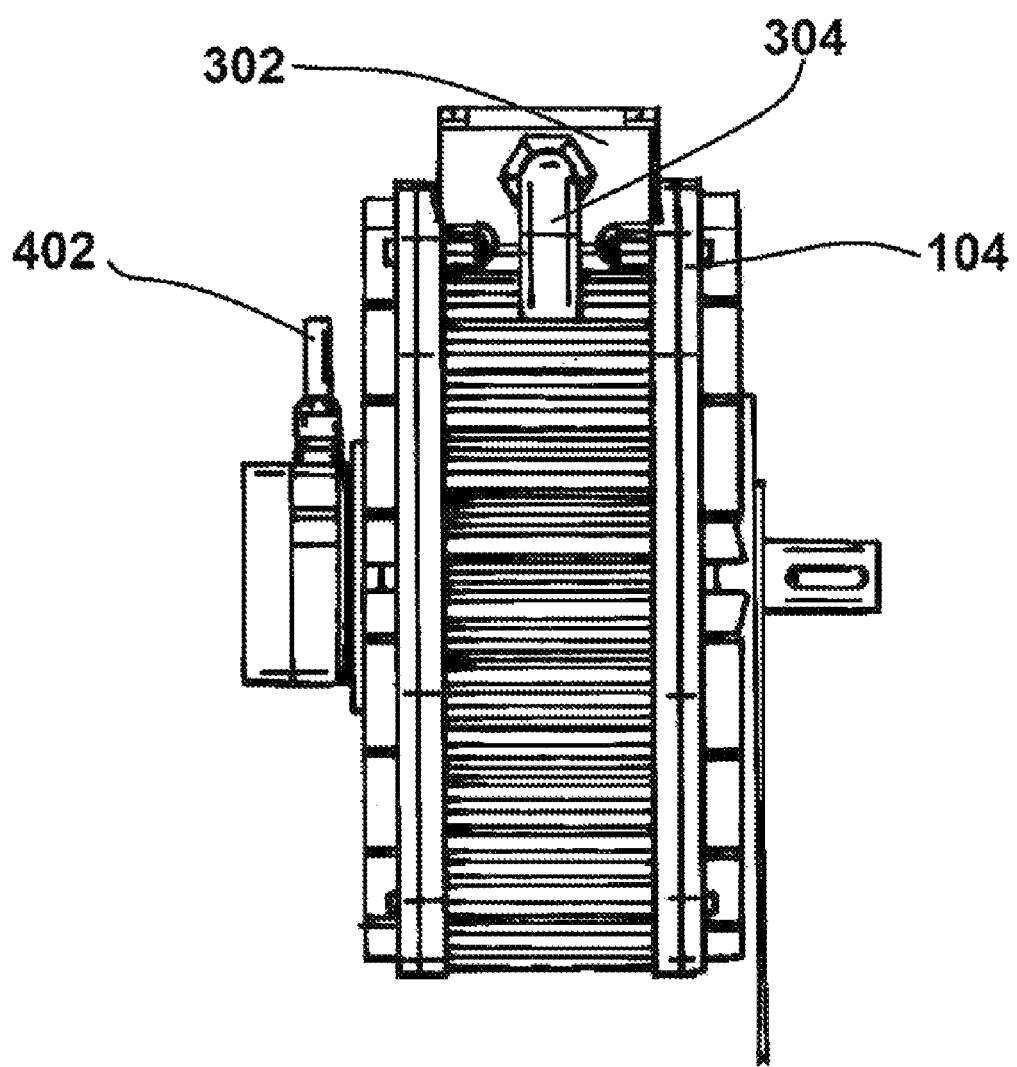
FIG. 4 is an illustration of a frontal view of an electric motor including a liquid cooling pump, according to one embodiment of the present invention.

FIG. 4 is an illustration of a frontal view of the electric motor 104 including the liquid cooling pump 302, according to one embodiment of the present invention. FIG. 3 shows tubular element 304 as described above and also shows the electric motor 104 including a tubular element 402 on the left side of the electric motor 104 wherein the tubular element 402 includes an internal volume that is contiguous with the internal volume of electric motor 104. Tubular element 402 is coupled with exit orifice 232 of frame 102. Tubular element 402 acts as a pathway for liquid coolant that pumped by liquid cooling pump 302 out of the internal volume of left-side bar 202 of frame 102, through exit orifice 232 and into the internal volume of electric motor 104.

Figure 5:
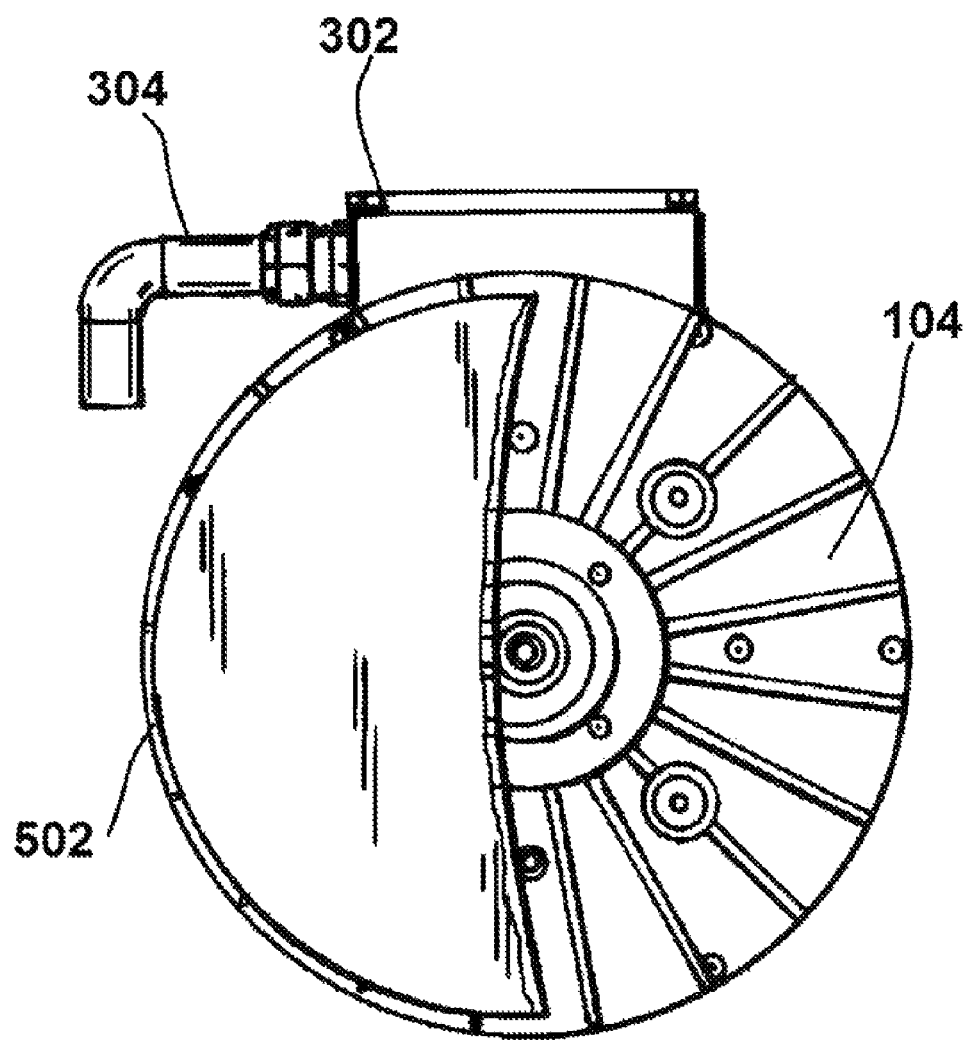
FIG. 5 is an illustration providing a more detailed side view of an interior of the electric motor of FIG. 3.

FIG. 5 is an illustration providing a more detailed right side view of an interior of the electric motor 104 of FIG. 3. FIG. 5 shows at least one continuous cavity 502 within the internal volume of electric motor 104. As explained above, the interior of the electric motor 104 includes components (not shown) well known to one of ordinary skill in the art, including a stator, a commutator and a rotor. In one embodiment of the present invention, the cavity 502 is in heat-conductive contact with the components of electric motor 104, including any or all of the stator, the commutator and the rotor. Via this arrangement, heat produced by the interior components of electric motor 104 is siphoned away from the components as liquid coolant passes through the cavity 502 during operation of the electric motor 104.

The path taken by the liquid coolant during operation of the electric motor 104 is as follows. Liquid coolant is present within the internal volume of electric motor 104 (e.g., the cavity 502). While present at this location, the liquid coolant siphons heat away from the interior components of electric motor 104 during operation of the electric motor 104. The pump 302 within electric motor 104 produces a pumping force that propels liquid coolant from within the internal volume of electric motor 104 (e.g., the cavity 502) to the tubular element 304 and through the entrance orifice 234. The liquid coolant enters the internal volume of right-side bar 204 of frame 102. The liquid travels up the right-side bar 204, through the tubular element 222, or bridge, into the internal volume of left-side bar 202 of frame 102 and down the left-side bar 202. As the liquid coolant travels through the internal volume of frame 102, the liquid coolant dissipates heat through the exterior surface of frame 102. As the motorcycle 100 drives or travels on a road, the ambient air cools the exterior surface of frame 102, thereby siphoning heat away from the frame 102 and, by extension, the liquid coolant within the frame 102. In short, heat from the liquid coolant is conducted to the frame 102 and subsequently from the frame 102 to the ambient air. Next, the liquid coolant travels from the left-side bar 202 of frame 102, through exit orifice 232, into tubular element 402 and back into the internal volume of the electric motor 104, thereby starting the liquid cooling cycle once more.

The components of the electric motorcycle 100 can be manufactured from a variety of materials using a variety of methods. In one embodiment of the present invention, the components of the electric motorcycle 100, including frame 102 can be manufactured from aluminum or an aluminum alloy. Aluminum can be either non-treated, clear or color anodized. The aluminum alloys are categorized into two types, non-heat-treatable and heat-treatable. Examples of such aluminum alloys are Types 1100, 3003, 5005, 5052, 2024, 6061, and 7075.

In another embodiment of the present invention, the components of the electric motorcycle 100 can be manufactured from hot-forged alloy steel that is oil quenched and tempered for maximum strength and durability. Additionally, the components of the electric motorcycle 100 may include nickel-chrome plating that resists rust. The components of the electric motorcycle 100 can be welded or coupled together using an arc welding process such as heli-arc welding.

The components of the electric motorcycle 100 can further be manufactured using a variety of methods for casting metals. Metal casting involves the shaping of free-flowing liquid metals through the use of dies, molds, or patterns. Common metal casting processes include sand casting, die casting, permanent mold casting, investment casting, centrifugal casting, and lost foam casting. The components of the electric motorcycle 100 can further be manufactured using metal injection molding (MIM) method for preparing metals. MIM is a powder metallurgy process used for manufacturing metal parts. Unlike powder metal, products manufactured by MIM can be case or through hardened, painted, and drilled and tapped.

The components of the electric motorcycle 100 can further be manufactured using a variety of metals, such as ferrous metals and alloys. Ferrous metals and alloys are iron-based materials that are used in a wide variety of industrial applications. Examples include carbon steels, alloy steels, stainless steels, tool steels, cast iron, cast steel, maraging steel, and specialty or proprietary iron-based alloys. The components of the electric motorcycle 100 can further be manufactured using nickel and nickel alloys. Nickel and nickel alloys are non-ferrous metals with high strength and toughness, excellent corrosion resistance, and superior elevated temperature properties.

In another embodiment of the present invention, the components of the electric motorcycle 100, including frame 102, can further be manufactured using carbon fiber, graphite fiber, carbon graphite, which is a material consisting of extremely thin fibers about 0.005-0.010 mm in diameter and composed mostly of carbon atoms. The carbon atoms are bonded together in microscopic crystals that are more or less aligned parallel to the long axis of the fiber. Several thousand carbon fibers are twisted together to form a yarn, which may be used by itself or woven into a fabric. Carbon fiber has many different weave patterns and can be combined with a plastic resin and wound or molded to form composite materials such as carbon fiber reinforced plastic to provide a high strength-to-weight ratio material.

In one embodiment, the frame 102 is composed of a carbon fiber fabric that is warp knitted. Warp knitting is a carbon fiber knitting method in which individual carbon fiber strands zigzag along the length of the carbon fiber fabric, i.e., following adjacent columns of knitting, rather than a single row. Warp knitting carbon fiber increases the strength qualities of carbon fiber fabric, and reduces the amount of carbon fiber needed, thereby resulting in a thinner and lighter fabric while still maintaining strength.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A cooling system for an electric motor of an electric motorcycle, including:
    a motorcycle frame including an internal volume, an entrance orifice and an exit orifice;
    an electric motor including an internal volume;
    a first tubular element connecting the exit orifice with the electric motor;
    a second tubular element connecting the electric motor with the entrance orifice;
    a liquid coolant located within the internal volume of the frame, the internal volume of the first and second tubular elements and the internal volume of the electric motor; and
    a pump for circulating the liquid coolant from the electric motor, through the second tubular element, through the entrance orifice of the frame, through the internal volume of the frame, through the exit orifice of the frame and back to the electric motor.

2. The cooling system of claim 1, wherein the liquid coolant comprises any one of water, ethylene glycol, diethylene glycol, or propylene glycol.

3. The cooling system of claim 1, wherein the motorcycle frame comprises a dual bar configuration comprising a left-side bar and a right-side bar, wherein both bars are coupled at one end to a stem of the frame and wherein both bars include an internal volume.

4. The cooling system of claim 3, further comprising:
    a tubular bridge that connects the left-side bar and the right-side bar such that the internal volume of the left-side bar is contiguous with the internal volume of the right-side bar.

5. The cooling system of claim 4, wherein the motorcycle frame is composed of a single, integrally-formed unit of metal.

6. The cooling system of claim 5, wherein the motorcycle frame is composed of a single, integrally-formed unit of carbon fiber.

7. The cooling system of claim 1, wherein the internal volume of the electric motor is in conductive contact with a stator and a commutator of the electric motor so as to allow the liquid coolant in the internal volume of the electric motor to siphon heat away from the armature and a commutator of the electric motor.

8. The cooling system of claim 7, wherein the pump is integrated with the electric motor.

9. The cooling system of claim 8, wherein a means of locomotion of the electric motor also produces a pumping force of the pump so as to propel the liquid coolant from the electric motor, into the frame and back.

10. A cooling system for an electric motor of an electric motorcycle, including:
    a motorcycle frame comprising a dual bar configuration comprising a left-side bar and a right-side bar, wherein both bars are coupled at one end to a stem of the frame and wherein both bars include an internal volume;
    an entrance orifice located in the right-side bar;
    a tubular bridge that connects the left-side bar and the right-side bar such that the internal volume of the left-side bar is contiguous with the internal volume of the right-side bar;
    an exit orifice located in the left-side bar;
    an electric motor including an internal volume;
    a first tubular element connecting the exit orifice with the electric motor;
    a second tubular element connecting the electric motor with the entrance orifice;
    a liquid coolant located within the internal volume of the right-side bar, the internal volume of the left-side bar, the internal volume of the first and second tubular elements and the internal volume of the electric motor; and
    a pump for circulating the liquid coolant from the electric motor, through the second tubular element, through the entrance orifice of the frame, through the internal volume of the right-side and left-side bars, through the exit orifice of the frame and back to the electric motor.

11. The cooling system of claim 10, wherein the liquid coolant comprises any one of water, ethylene glycol, diethylene glycol, or propylene glycol.

12. The cooling system of claim 10, wherein the motorcycle frame is composed of a single, integrally-formed unit of metal.

13. The cooling system of claim 12, wherein the motorcycle frame is composed of a single, integrally-formed unit of carbon fiber.

14. The cooling system of claim 10, wherein the internal volume of the electric motor is in conductive contact with a stator and a commutator of the electric motor so as to allow the liquid coolant in the internal volume of the electric motor to siphon heat away from the armature and a commutator of the electric motor.

15. The cooling system of claim 14, wherein the pump is integrated with the electric motor.

16. The cooling system of claim 15, wherein a means of locomotion of the electric motor also produces a pumping force of the pump so as to propel the liquid coolant from the electric motor, into the frame and back.

* * * * *